United States Patent
Chor (10) Patent No.: US 10,845,949 B2
(45) Date of Patent: Nov. 24, 2020

(54) CONTINUITY OF EXPERIENCE CARD FOR INDEX

(71) Applicant: Oath Inc., New York, NY (US)

(72) Inventor: Jesse Chor, Los Gatos, CA (US)

(73) Assignee: Oath Inc., New York, NY (US)

(*) Notice: Subject to any disclaimer, the term of this patent is extended or adjusted under 35 U.S.C. 154(b) by 812 days.

(21) Appl. No.: 14/867,755

(22) Filed: Sep. 28, 2015

(65) Prior Publication Data

US 2017/0090690 A1    Mar. 30, 2017

(51) Int. Cl.
| | |
|---|---|
| G06F 3/0482 | (2013.01) |
| G06F 3/14 | (2006.01) |
| G06F 9/451 | (2018.01) |
| G06F 8/38 | (2018.01) |
| G06F 3/0481 | (2013.01) |

(52) U.S. Cl.
CPC .......... *G06F 3/0482* (2013.01); *G06F 3/0481* (2013.01); *G06F 8/38* (2013.01); *G06F 9/451* (2018.02); *G06F 3/14* (2013.01)

(58) Field of Classification Search
CPC ........ G06F 3/0482; G06F 3/14; G06F 3/0481; G06F 8/38; G06F 9/44; G06F 9/4443; G06F 9/461; G06F 9/485; G06F 9/4806
See application file for complete search history.

(56) References Cited

U.S. PATENT DOCUMENTS

| | | | |
|---|---|---|---|
| 6,271,840 B1 | 8/2001 | Finseth et al. | |
| 7,581,188 B2 | 8/2009 | Hiles et al. | |
| 8,188,936 B2 | 5/2012 | Fuller et al. | |
| 8,433,800 B2 | 4/2013 | Chor | |
| 8,438,245 B2 | 5/2013 | Chor | |
| 8,745,617 B1 | 6/2014 | Stekkelpak et al. | |
| 8,843,477 B1 | 9/2014 | Tirumalareddy et al. | |
| 9,442,946 B1 | 9/2016 | Yuan et al. | |
| 9,678,637 B1 | 6/2017 | Brothers et al. | |
| 2003/0046401 A1 | 3/2003 | Abbott et al. | |
| 2006/0136832 A1* | 6/2006 | Keller | G06F 3/0481 715/765 |
| 2006/0184617 A1 | 8/2006 | Nicholas | |

(Continued)

FOREIGN PATENT DOCUMENTS

CN    102870065 A    1/2013

OTHER PUBLICATIONS

Wilbert O. Galitz, The Essential Guide to User Interface Design: An Introduction to GUI Design Principles and Techniques, 3rd Edition, Apr. 16, 2007, John Wiley & Sons, All pages. (Year: 2007).*

(Continued)

*Primary Examiner* — Tan H Tran
(74) *Attorney, Agent, or Firm* — Cooper Legal Group, LLC (57) ABSTRACT

Disclosed are methods and apparatus for facilitating continuity of experience of a user. A list of user interface object candidates associated with a user identifier may be identified based, at least in part, on states of user interface objects that have previously been presented via one or more client devices associated with the user identifier. The list of user interface object candidates may be prioritized. One or more user interface objects may be provided for display via a client device associated with the user identifier according to a result of the prioritizing.

24 Claims, 3 Drawing Sheets

(56) References Cited

U.S. PATENT DOCUMENTS

| | | | |
|---|---|---|---|
| 2007/0021154 A1* | 1/2007 | Jung | H04M 1/72547 |
| | | | 455/566 |
| 2008/0146245 A1 | 6/2008 | Appaji | |
| 2008/0189360 A1 | 8/2008 | Kiley | |
| 2008/0276182 A1 | 11/2008 | Leow | |
| 2009/0061841 A1 | 3/2009 | Chaudhri et al. | |
| 2009/0265646 A1 | 10/2009 | Cho et al. | |
| 2009/0288022 A1 | 11/2009 | Almstrand et al. | |
| 2009/0322650 A1 | 12/2009 | Kakie | |
| 2010/0057770 A1 | 3/2010 | Kumashio | |
| 2010/0332518 A1 | 12/2010 | Song et al. | |
| 2011/0126050 A1* | 5/2011 | Begole | G06Q 10/10 |
| | | | 714/18 |
| 2011/0131506 A1 | 6/2011 | Calissendorff | |
| 2011/0214077 A1 | 9/2011 | Singh et al. | |
| 2011/0246918 A1 | 10/2011 | Henderson | |
| 2012/0011511 A1* | 1/2012 | Horvitz | G06F 9/461 |
| | | | 718/100 |
| 2012/0021774 A1 | 1/2012 | Mehta et al. | |
| 2012/0036453 A1 | 2/2012 | Appel | |
| 2012/0095979 A1 | 4/2012 | Aftab et al. | |
| 2012/0137235 A1 | 5/2012 | Sabarish et al. | |
| 2012/0138671 A1 | 6/2012 | Gaede | |
| 2012/0140255 A1 | 6/2012 | Tanaka | |
| 2012/0158472 A1 | 6/2012 | Singh et al. | |
| 2012/0317504 A1 | 12/2012 | Patel et al. | |
| 2012/0324434 A1 | 12/2012 | Tewari et al. | |
| 2013/0014040 A1 | 1/2013 | Jagannathan et al. | |
| 2013/0024796 A1 | 1/2013 | Seo | |
| 2013/0080890 A1 | 3/2013 | Krishnamurthi | |
| 2013/0132896 A1 | 5/2013 | Lee et al. | |
| 2013/0166527 A1 | 6/2013 | Kasterstein et al. | |
| 2013/0172021 A1 | 7/2013 | Karmarkar et al. | |
| 2013/0187753 A1 | 7/2013 | Chiriyankandath | |
| 2013/0275915 A1 | 10/2013 | Wang | |
| 2013/0304608 A1 | 11/2013 | Mehta et al. | |
| 2013/0305218 A1 | 11/2013 | Hirsch et al. | |
| 2013/0326499 A1 | 12/2013 | Mowatt et al. | |
| 2013/0332518 A1 | 12/2013 | Chor | |
| 2013/0332886 A1 | 12/2013 | Cranfill et al. | |
| 2013/0346347 A1 | 12/2013 | Patterson et al. | |
| 2014/0037107 A1 | 2/2014 | Marino, Jr. et al. | |
| 2014/0071036 A1 | 3/2014 | Blue | |
| 2014/0089382 A1 | 3/2014 | Wang et al. | |
| 2014/0120961 A1 | 5/2014 | Buck | |
| 2014/0143196 A1* | 5/2014 | White | G06F 9/4856 |
| | | | 706/46 |
| 2014/0146074 A1 | 5/2014 | Kwon | |
| 2014/0169641 A1 | 6/2014 | Lee et al. | |
| 2014/0188956 A1 | 7/2014 | Subba et al. | |
| 2014/0201655 A1 | 7/2014 | Mahaffey et al. | |
| 2014/0201681 A1 | 7/2014 | Mahaffey et al. | |
| 2014/0278995 A1* | 9/2014 | Tang | G06Q 30/0257 |
| | | | 705/14.55 |
| 2015/0058744 A1 | 2/2015 | Dhingra et al. | |
| 2015/0065170 A1 | 3/2015 | Brisebois | |
| 2015/0100552 A1* | 4/2015 | Malis | G06Q 10/06 |
| | | | 707/650 |
| 2015/0106737 A1 | 4/2015 | Montoy-Wilson et al. | |
| 2015/0154519 A1* | 6/2015 | Doolan | G06Q 10/063 |
| | | | 705/7.11 |
| 2015/0248193 A1 | 9/2015 | Fujioka | |
| 2015/0296072 A1 | 10/2015 | Zhou et al. | |
| 2016/0077674 A1* | 3/2016 | Forster | G06F 3/0481 |
| | | | 715/753 |
| 2016/0077808 A1 | 3/2016 | Friedman et al. | |
| 2016/0092071 A1 | 3/2016 | Lawson et al. | |
| 2016/0247110 A1* | 8/2016 | Sinha | G06Q 10/06316 |
| 2016/0284321 A1 | 9/2016 | Cho | |
| 2016/0358227 A1* | 12/2016 | McAfee | G06Q 30/02 |
| 2017/0115848 A1 | 4/2017 | Plasmeier | |
| 2017/0118201 A1 | 4/2017 | Hoyer et al. | |
| 2017/0177582 A1 | 6/2017 | Plasmeier et al. | |

OTHER PUBLICATIONS

U.S. Office Action dated Dec. 14, 2017 issued in U.S. Appl. No. 14/977,390.
U.S. Office Action dated Oct. 5, 2017 issued in U.S. Appl. No. 14/921,983.
U.S. Office Action dated Oct. 6, 2016 issued in U.S. Appl. No. 14/513,079.
U.S. Final Office Action dated May 3, 2017 issued in U.S. Appl. No. 14/513,079.
U.S. Office Action dated Apr. 4, 2018 issued in U.S. Appl. No. 14/513,079.
WO International Search Report and Written Opinion dated Jan. 29, 2015, issued in Application No. PCT/US2014/060310.
WO International Preliminary Report on Patentability dated Apr. 19, 2016, issued in Application No. PCT/US2014/060310.
WO International Search Report and Written Opinion dated Mar. 27, 2017, issued in Application No. PCT/US2016/056149.
WO International Search Report and Written Opinion dated Feb. 17, 2017, issued in Application No. PCT/US2016/066411.
CN Office Action dated Jan. 25, 2018, issued in Application No. 201480055431.6, ( no translation).
EP Extended Search Report dated Jun. 7, 2017, issued in Application No. 14854058.6.
EverythingMe Launcher by EverythingMe, "Get the most out of your phone," Dec. 2010, downloaded from http://everything.me/.
Yahoo! Aviate, "The intelligent homescreen that simplifies your phone," Nov. 24, 2014, downloaded from http://aviate.yahoo.com/.
Kazmucha, Allyson, "iOS 8 Tips—How to enable and disable app suggestions in iOS 8," Sep. 17, 2014, downloaded from http://www.imore.com/how-enable-and-disable-app-suggestions-ios-8.
U.S. Appl. No. 13/966,118, Notice of Allowance dated Feb. 16, 2016.
Amazon, "Getting started with the Alexa Skills Kit," downloaded from https://developer.amazon.com/public/solutions/alexa/alexa-skills-kit/getting-started-guide, © Amazon.com, Inc. 2010-2014.
Wikipedia, "Amazon Echo," downloaded from https://en.wikipedia.org/wiki/Amazon_Echo, last modified Apr. 9, 2016.
U.S. Final Office Action dated Jul. 6, 2018 issued in U.S. Appl. No. 14/977,390.
U.S. Final Office Action dated May 22, 2018 issued in U.S. Appl. No. 14/921,983.
U.S. Office Action dated Nov. 16, 2018 issued in U.S. Appl. No. 14/921,983.
U.S. Final Office Action dated Oct. 23, 2018 issued in U.S. Appl. No. 14/513,079.
U.S. Office Action dated Apr. 2, 2019 issued in U.S. Appl. No. 14/513,079.
WO International Preliminary Report on Patentability dated Apr. 24, 2018, issued in Application No. PCT/US2016/056149.
WO International Preliminary Report on Patentability dated Jun. 26, 2018, issued in Application No. PCT/US2016/066411.
CN Office Action dated Oct. 15, 2018, issued in Application No. 201480055431.6.

* cited by examiner

CONTINUITY OF EXPERIENCE CARD FOR INDEX

BACKGROUND OF THE INVENTION

The present disclosure relates generally to computer implemented methods and apparatus for facilitating the continuity of experience of a user.

Mobile applications are becoming ubiquitous due to the increasing popularity of mobile devices such as smartphones and tablets. Due to an increasing availability and usage of mobile applications, mobile devices often have a very large number of applications installed. Given the limited screen size of mobile devices and lack of a keyboard, it is often tedious for users to search for an application they want to use through a potentially very large collection of installed applications.

To find applications that are used often, a user may manually organize their applications on their mobile device. For example, a user may arrange icons representing applications within a homescreen displayed on a screen of their mobile device. When a user wishes to use an application, they may click on the corresponding icon.

SUMMARY OF THE INVENTION

In one embodiment, a list of user interface object candidates associated with a user identifier may be identified based, at least in part, on states of user interface objects that have previously been presented via one or more client devices associated with the user identifier. The list of user interface object candidates may be prioritized. One or more user interface objects may be provided for display via a client device associated with the user identifier according to a result of the prioritizing.

In another embodiment, the invention pertains to a device comprising a processor, memory, and a display. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

DETAILED DESCRIPTION OF THE SPECIFIC EMBODIMENTS

Reference will now be made in detail to specific embodiments of the disclosure. Examples of these embodiments are illustrated in the accompanying drawings. While the disclosure will be described in conjunction with these specific embodiments, it will be understood that it is not intended to limit the disclosure to these embodiments. On the contrary, it is intended to cover alternatives, modifications, and equivalents as may be included within the spirit and scope of the disclosure as defined by the appended claims. In the following description, numerous specific details are set forth in order to provide a thorough understanding of the disclosure. The disclosed embodiments may be practiced without some or all of these specific details. In other instances, well known process operations have not been described in detail in order not to unnecessarily obscure the disclosure. The Detailed Description is not intended as an extensive or detailed discussion of known concepts, and as such, details that are known generally to those of ordinary skill in the relevant art may have been omitted or may be handled in summary fashion.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Generally, a homescreen of a mobile device displays icons representing applications according to a grid. More particularly, the grid may be defined by a fixed number of rows and/or columns, where each row or column may include a maximum number of icons. In some instances, the icons within the grid may be displayed with the same dimensions.

For example, the grid may be a 5×4 grid that includes five rows and four columns, enabling a maximum of 20 icons to be displayed within the grid.

An icon within a homescreen may also represent a tile or set of tiles, which may also be referred to as cards. For example, an icon may represent a folder in which multiple tiles are maintained. Thus, an icon may represent a single tile or a collection of tiles. A collection of tiles may also be referred to as a "stack" of cards. To view a card or "stack" of cards, the user may click on the icon, which may produce a larger, "full-size" version of a card (e.g., the card at the top of the stack).

In addition, some mobile applications enable a stream of content items to be displayed via a display of the mobile device. Generally, a user may scroll within the stream of content items to view the content items. Each content item may be displayed within a corresponding tile within the display. For example, a tile may correspond to a rectangular area within the display.

A user may interact with a variety of different types of user interface objects displayed via their mobile device. Generally, a user interface object may include any graphical representation or user interface with which a user may interact. For example, a user interface object may include an icon representing an application, an icon representing content, a web page, a tile displaying content, a folder containing content (e.g., a stack of cards), a folder containing applications, or other graphical representation or user interface. Thus, a user interface object may include text and/or image(s). A user interface object may be generated and stored as a data structure in a language such as an object-oriented language, and may be retrieved for display via a client device. A user may interact with a user interface object that is displayed, for example, by clicking (or tapping) on the user interface object.

In some instances, a user may be performing a task such as purchasing an item via a web page when the user is interrupted or decides to move on to another task. Similarly, a user may be using an electronic mail application to compose an email to a friend when he or she gets interrupted, resulting in an unfinished and unsent email. In other instances, the user may be viewing tiles of content when the user decides to shut down their device, leaving some of the tiles of content unopened and in an incomplete state. Unfortunately, there is no simple mechanism for reminding the user of where they left off or facilitating the user in resuming a task that the user has not finished.

The disclosed embodiments facilitate the continuity of experience of a user by "retargeting" the user's attention to a task that the user has not completed. This may be accomplished, at least in part, by presenting a user interface object such as a "retargeting card" for display via a client device of the user. The continuity of experience may be maintained with respect to a single client device or across multiple client devices.

The presentation of a user interface object (e.g., card) to facilitate the continuity of experience of a user may be implemented via one or more servers and/or one or more client devices. An example system via which the disclosed embodiments may be implemented will be described in further detail below with reference to FIG. 1.

Figure 1:
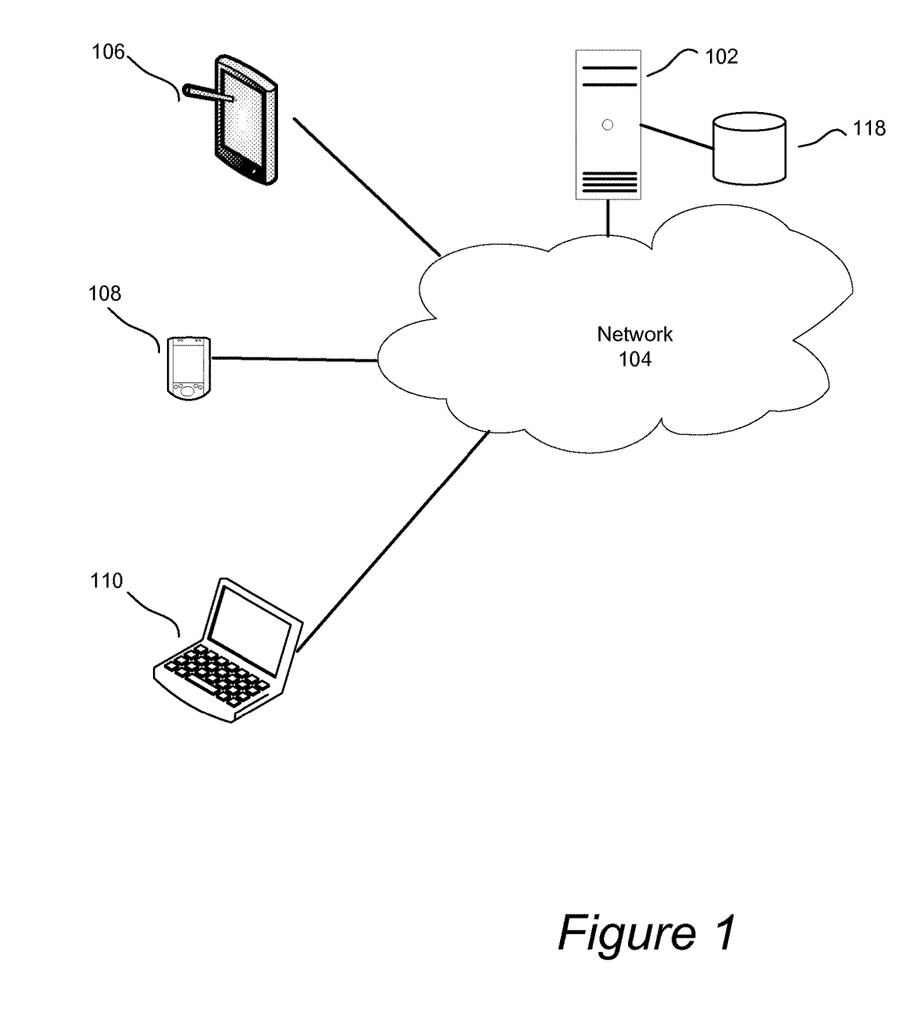
FIG. 1 is a block diagram illustrating an example system in which various embodiments may be implemented.

FIG. 1 is a diagram illustrating an example system in which various embodiments may be implemented. The disclosed embodiments may be implemented in some centralized manner. This is represented in FIG. 1 by server(s) 102, which may correspond to multiple distributed devices and data store(s). The server(s) 102 and/or corresponding data store(s) may store user account data, user information such as user profiles, query logs, search logs, and/or content.

The server(s) 102 may be associated with a web site that provides a variety of services to its users. More particularly, the server(s) 102 may include a web server, electronic mail server, search server, and/or content server. As will be described in further detail below, the server(s) 102 may facilitate the continuity of experience of users through the identification of actions that the users may not have completed.

Embodiments disclosed herein may be implemented via the server(s) 102 and/or the clients 106, 108, 110. For example, various features may be implemented via an index application installed on the clients 106, 108, 110. The index application may operate independently to identify and present at least one user interface object (e.g., card) via the client to direct a user's attention to a task that the user may not have completed. Alternatively, the continuity of experience may be facilitated via communications transmitted between a retargeting application on the server(s) 102 and the index application on the clients 106, 108, 110 via a network 104. In some embodiments, the index application may be integrated with a homescreen application. The disclosed embodiments may be implemented via software and/or hardware.

A retargeting application may be implemented on any number of servers although only a single server 102 is illustrated for clarity. The client devices 106, 108, 110 may be implemented, for example, via any type of computer (e.g., desktop, laptop, tablet, etc.), media computing platforms (e.g., cable and satellite set top boxes), handheld computing devices (e.g., PDAs), cell phones, or any other type of computing or communication platform.

The network 104 may take any suitable form, such as a wide area network or Internet and/or one or more local area networks (LAN's). The network 104 may include any suitable number and type of devices, e.g., routers and switches, for forwarding search or web object requests from each client to the search or web application and search or web results back to the requesting clients.

The disclosed embodiments may be practiced in a wide variety of network environments (represented by network 104) including, for example, TCP/IP-based networks, telecommunications networks, wireless networks, etc. In addition, computer program instructions with which embodiments of the invention may be implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The server(s) 102 may facilitate the continuity of experience of a user based, at least in part, on information maintained in a user profile of the user. More particularly, the server(s) 102 may transmit a list of proposed user interface objects (e.g., retargeting cards) to the index application of one of the clients 106, 108, 110 via the network 104. Proposed user interface objects may also be referred to as user interface object candidates or "retargeting opportunities." Stated another way, the list may operate as a "To Do List" for the user, where each item in the list identifies an action that the user has not completed. In some instances, an item may identify an action that the user started, but did not finish. Thus, each item in the list may correspond to a proposed user interface object (e.g., retargeting card) that may be displayed via the corresponding client. The list may also include or be linked to information that enables the corresponding proposed user interface objects to be displayed. In some embodiments, the server(s) 102 may transmit one or more user interface objects (rather than a list of objects), which may be displayed by the corresponding client. In this manner, the server(s) 102 may recommend retargeting cards (e.g., reminder cards) for display via a client device.

The client device (e.g., index application) may act as arbiter to decide which of the proposed user interface objects, if any, to display. In some instances, the index application may decide to display a user interface object (e.g., retargeting card) that it has identified or generated independently from the server(s) 102. Various mechanisms for facilitating the continuity of experience of the user will be described in further detail below with reference to FIG. 2.

In some embodiments, the user may opt-in or opt-out of receiving retargeting cards. This may be accomplished, for example, by logging in to a user account and opting in or out of receiving task reminders via a graphical user interface. Alternatively, the user may opt-in or out via a graphical user interface provided by the index application. In addition, the user may opt-in by launching the index application or opt-out by closing the index application.

The user may also establish preferences as to the timing and/or content of retargeting cards. The preferences may be submitted via the user account or locally via the client device. For example, the user may submit user preferences via a graphical user interface presented via the index application. Preferences may include positive preferences and/or negative preferences (e.g., exclusions). In some embodiments, preferences may indicate desired personas (e.g., personalities, moods, tones, interests).

The user may also set up card retargeting preferences with respect to the sources that will be monitored to identify retargeting cards. For example, the user may submit a username (or electronic mail address) and password for each electronic mail account and/or social network account that the user wishes to be monitored for identification of retargeting cards. In addition, the user may indicate whether he or she wishes monitoring to be performed for messages transmitted by the user and/or messages received by the user. Therefore, messages received and/or transmitted via these accounts may be parsed for extraction of unfinished tasks according to the user preferences.

As will be described in further detail below, the server(s) 102 and/or client devices 106, 108, 110 may identify retargeting opportunities for which a retargeting card may be displayed via a client device of the user. More particularly, retargeting opportunities may identify tasks that the user has not yet started. In addition, retargeting opportunities may identify actions that the user has started but has not completed.

In accordance with various embodiments, retargeting opportunities may be identified based, at least in part, on the states of the user interface objects that were previously displayed via one or more client devices associated with the user. More particularly, user interface objects having an incomplete state may be identified.

When a user interface object is created, the user interface object may include content such as text and/or image(s). In addition, the user interface object may maintain state information. The state information associated with a user interface object may be saved, for example, after a period of inactivity, a shutdown of the client device, or a shutdown of the index application.

The state information of a user interface object such as a card may include various types of information. More particularly, the state information may indicate the time that the user interface object was created, a deadline by which the user interface object will no longer be relevant, the time that any content within the user interface object was created, whether the user interacted with the user interface object, a priority, an importance, and/or any contextual information that enables a previous state to be resumed. For example, where the user interface object is a card that reminds the user to send an anniversary card, the state information may indicate that the user interface object is of high priority and that the user interface object will expire the date after the anniversary. As another example, where a user interface object includes or represents a set of content, the state information may indicate the time that the user interface object was created, the time that the set of content was created, and/or whether the user interacted with the set of content. As yet another example, where a user interface object represents an application, the state information may indicate the time that the application was installed, whether the user opened the application, the last state of the application (e.g., whether the application was last in an open state), and any contextual information that enables the last state to be resumed.

A user interface object such as a card may be destroyed (e.g., deleted) under various circumstances. For example, if the state information of a card indicates that the card has been displayed for a threshold amount of time, the card may be destroyed. As another example, if the state information of a card indicates that the content is no longer relevant, the card may be destroyed.

A user interface object that has previously been displayed via a client device of the user may have associated state information that indicates whether the user interface object is complete or incomplete. In some embodiments, the incomplete state may include one or more of the following conditions: 1) the user has not yet interacted with a user interface object; 2) a user interface object has been displayed for at least a minimum threshold period of time; 3) a user interface object is going to be destroyed within a threshold amount of time; or 4) the user has interacted with a user interface object for which state information has been saved.

In addition, retargeting opportunities may be identified based, at least in part, on a calendar of the user, messages composed by the user (and not sent), messages transmitted by the user, and/or messages received by the user. For example, the user may have composed or started composing a message that was never sent. As another example, the user may have been asked in a message received by the user to perform a particular action or, alternatively, the user may have offered or promised to perform a particular action in a message sent by the user. Messages may include, but are not limited to, electronic mail messages, short messaging service (SMS) messages, microblogging messages (e.g., twitter messages), messages sent during a chat session via an instant messaging application, and/or messages composed, received, or sent via another messaging application.

In some embodiments, a retargeting opportunity may be identified based, at least in part, on information received from an external server (not shown). For example, the server(s) 102 may receive information that indicates that the user was shopping on a web site and added items to a shopping cart, but did not complete the checkout process.

In accordance with various embodiments, retargeting opportunities for a user may be identified based, at least in part, on information retained in a user profile. The server 102 (or servers) may have access to a plurality of user profiles of users. Each profile may be associated with a corresponding user represented by a user account identifier, browser identifier, and/or client device identifier.

A user profile may be associated with one or more client devices. Conversely, each client device may be associated with a set of one or more users, enabling user profile(s) associated with the client device to be identified. Therefore, the continuity of experience of a user may be facilitated across multiple client devices of the user.

In accordance with various embodiments, the server(s) 102 may have access to one or more user logs 118 (e.g., user databases) into which user information is retained for each of a plurality of users. This user information or a portion thereof may be referred to as a user profile. More particularly, the user profile may include public information that is available in a public profile and/or private information. The user logs 118 may be retained in one or more memories that are coupled to the server 102.

Similarly, the client devices 106, 108, 110 may maintain a local copy of a user profile or portion thereof. Moreover, a client device may have access to additional information that the server(s) 102 do not. For example, a client device may be aware of which tiles or icons have recently been displayed via the client device, as well as any interaction of the user with those tiles. Therefore, a client device may maintain a user profile that is different from that maintained by the server(s) 102.

The user information retained in a user profile may indicate a plurality of features for a corresponding user. More particularly, the features may include personal information such as demographic information (e.g., age, marital status, and/or gender) and/or geographic information (e.g., residence address and/or work address). In addition, the features may indicate types of content consumed by the user and/or interests of the user.

In some instances, the geographic information maintained in a user profile may indicate the current location of a user. The current location of a user may be identified based upon signals explicitly transmitted by the user or implicit signals. Examples of implicit signals include an Internet Protocol (IP) address or Global Positioning System (GPS) location of a client device, which may be used to infer a location of the user. As another example, the user's location may be implied through cell tower triangulation. In addition, a user may explicitly check in to a location via the use of a check in application, which may be accessed via a website and/or installed on a client device such as a mobile device.

In accordance with various embodiments, the user profile may identify a list of "retargeting opportunities" for which a retargeting card may be presented via a client device of the user. In some instances, the retargeting opportunities may identify user interface objects having an incomplete state, where the user interface objects have previously been presented via one or more client devices of the user. More particularly, a user interface object or an application associated therewith may save state information. Therefore, a user profile may indicate the states of user interface objects previously presented via one or more client device(s).

The user profile may also include information pertaining to retargeting cards that have been displayed to the user. In addition, the user profile may indicate whether the user has interacted with the retargeting card.

In some embodiments, a prediction model may be trained to select at least one optimum retargeting opportunity for which to present a retargeting card. Therefore, the user profile may include parameter values associated with the prediction model.

In addition, the user profile may indicate user preferences with respect to the selection and/or presentation of retargeting card(s). For example, the user preferences may indicate whether the user has opted in or out of receiving retargeting cards, the location(s) within a screen of a client device in which retargeting card(s) are to be presented, and/or the amount of time the retargeting card(s) is to be displayed before being automatically deleted. As another example, the user preferences may indicate at least one persona (e.g., personality, mood, tone, goal, or interest) for which the retargeting card(s) is to be displayed.

The user profile may also indicate preferences with respect to sources from which unfinished tasks will be identified. For example, the user profile may indicate whether the user wishes to receive retargeting cards to be identified using calendar(s) of the user, messages composed by the user, messages, sent by the user, and/or messages received by the user. As another example, the user profile may indicate specific user accounts (e.g., electronic mail accounts, social media accounts) via which unfinished tasks may be extracted, as well as corresponding passwords.

In addition, each time a user performs online activities such as clicking on a web page (or region thereof) or an advertisement, or purchasing goods or services, information regarding such activity or activities may be retained as user data in the user profile. For example, the user profile may indicate the identity of web sites visited, identity of ads that have been selected (e.g., clicked on), and/or a timestamp. In addition, the features may indicate a purchase history with respect to one or more products, one or more types of products, one or more services, and/or one or more types of services.

The user logs 118 may further include query logs into which search information is retained. Each time a user performs a search on one or more search terms, information regarding such search may be retained in the query logs. For instance, the user's search request may contain any number of parameters, such as user or browser identity and the search terms, which may be retained in the query logs. Additional information related to the search, such as a timestamp, may also be retained in the query logs along with the search request parameters. When results are presented to the user based on the entered search terms, parameters from such search results may also be retained in the query logs. For example, an identity of the specific search results (e.g., Uniform Resource Locators (URLs)), such as the web sites, the order in which the search results are presented, whether each search result is a sponsored or algorithmic search result, the owner (e.g., web site) of each search result, and/or whether each search result is selected (i.e., clicked on) by the user (if any), may be retained in the query logs.

A variety of mechanisms may be implemented to support the generation or updating of user profiles including, but not limited to, collecting or mining navigation history, stored documents, tags, messages, or annotations, to provide a few examples. Profiles of users of a search engine, for example, may give a search engine provider a mechanism to retrieve annotations, tags, stored pages, navigation history, or the like, which may be useful for making relevance determinations of search results, such as with respect to a particular user.

To facilitate the continuity of experience of a user, the retargeting application and/or index application may identify and present a set of one or more user interface objects (e.g., cards) via a client device of a user. Example methods of facilitating the continuity of experience of a user will be described in further detail below.

Figure 2:
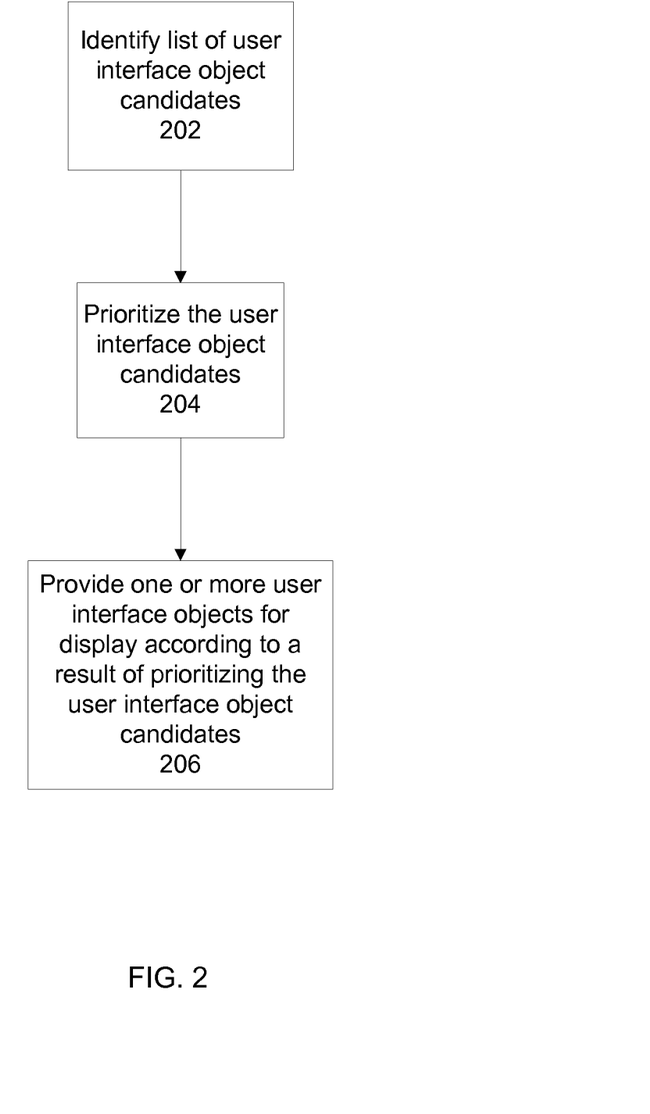
FIG. 2 is a process flow diagram illustrating an example method of facilitating the continuity of experience of a user in accordance with various embodiments.

FIG. 2 is a process flow diagram illustrating an example method of facilitating the continuity of experience of a user in accordance with various embodiments. As will be described in further detail below, a list of user interface object candidates may be identified at 202, where each of the user interface object candidates is a candidate for presentation as a user interface object such as a card. Stated another way, the list may include a "to do list" that identifies tasks that the user should perform or complete. Each of these tasks is a "candidate" for presentation as a retargeting card via a display of a client device. The candidates may be identified in association with a particular user identifier (e.g., account identifier, client device identifier and or browser identifier).

In some instances, a candidate may identify a user interface object that has previously been presented to the user via a display of a client device. For example, a user interface object may represent an application, set of content items, or a web page. In other instances, a candidate may not yet be generated (e.g., instantiated) as a user interface object. The list may include or be linked to additional information that would enable the user interface objects (e.g., previously displayed or newly generated) to be displayed.

The server(s) 102 and/or a client device may generate the list identifying the candidates. In some embodiments, the list may be identified via application of various heuristics or a computer-generated model. In addition, the list may be identified based, at least in part, on information from a user profile such as user preferences or user location, enabling cards to be personalized for the user.

In some instances, the client device may send a request to the server(s) 102 to ask the server(s) 102 if the server(s) 102 are aware of any unfinished actions of the user. In this manner, the client device may send a request to the server(s) 102 for user interface object candidates. For example, the client device may send a request for user interface object candidates after the client device is turned on, the index application is loaded on the client device, or the index application is launched. The server(s) 102 may send a set of user interface object candidates to the client device, either in response to a client request or in the absence of receiving a request.

In addition, the client device may locally identify user interface object candidates. For example, the client device may maintain an index of user interface objects (e.g., cards) that have previously been presented via the client device.

The user interface object candidates may be identified based, at least in part, on states of user interface objects that have previously been presented to the user via one or more client devices in association with the user identifier. More particularly, user interface objects having an incomplete state may be identified.

User interface objects having an incomplete state may be identified from state information maintained by each user interface object or in association with each user interface object. For example, the state information of a user interface object may indicate a state of the corresponding user interface object, a time that the user interface object was created, a time that any content of the user interface object was created, a time that the user interface object was previously displayed via a client device associated with the user identifier, whether a user interacted whether the user interface object, any contextual information enabling a previous state to be resumed, a priority, and/or importance of the user interface object.

In some embodiments, an application installed on the client device may notify the index application running on the client device that the state of the application is incomplete. For example, the application may transmit a message to the index application via an application programming interface (API), where the message indicates that the state of the application is incomplete. The message may further include state information such as a priority and/or importance of the application.

In addition, candidates may be identified based, at least in part, on any "unfinished" actions of a user associated with the user identifier. A user interface object representing an unfinished action of the particular user may be identified, retrieved, or generated at a later time (e.g., prior to providing the user interface object for display).

Unfinished actions may be identified via a variety of mechanisms. In some instances, unfinished actions may be identified based, at least in part, on information received from an external server. In addition, unfinished actions may be identified based, at least in part, on messages that may have been composed but not sent by the user, content of messages that have been transmitted or received by the user, and/or content of a calendar of the user.

In accordance with various embodiments, an external server may transmit information pertaining to an unfinished action of a user to the server(s) 102 via an API, either in response to a request received from the server(s) 102 or in the absence of a request. The server(s) 102 may generate a user interface object (e.g., retargeting card) from the information or provide the information to the client device, enabling a user interface object such as a retargeting card to be generated and displayed by the client device. The information pertaining to an unfinished action may include, but is not limited to, a user identifier (e.g., client device, user/account identifier, or browser identifier), text, image(s), a hypertext link, and/or any additional state or contextual information.

As one example, the server(s) 102 may transmit a request to an external server associated with a corresponding web site via an API to ask if the web site is aware of any unfinished actions that the user started but did not complete. The request may include a user identifier (e.g., account identifier, device identifier, and/or browser identifier), and may further include additional user data maintained in a user profile of the user. For example, the user data may indicate a location of the user or client device of the user. In this manner, the server(s) 102 may ask the external server if it is aware of a user interface object such as a web page associated with the user identifier that has been left in an incomplete state (e.g., where state information has been saved in association with the web page).

If the external server recognizes the user identifier (e.g., device identifier or browser identifier) and is aware of an unfinished action that the user started but did not complete, the external server may transmit information to the server(s) 102 that enables the user to resume the unfinished action. For example, the information may indicate that the user has a shopping cart that includes items that the user has not purchased.

In some embodiments, the server(s) 102 may transmit a request to an external server to auction the opportunity to present a retargeting card to the user. More particularly, the server(s) 102 may obtain multiple bids and select one or more of the bids based, at least in part, on the monetary value of the bids. In some instances, the external server may provide an incentive for the user to click on a retargeting card. For example, the external server may provide the user 100 free tokens if they return to access a particular gambling application or web page.

In addition, the server(s) 102 and/or client may identify an unfinished action based, at least in part, on messages received by the user, messages composed by the user, and/or messages transmitted by the user. For example, where the user has composed a message but did not transmit the message, the sending of the message may be flagged as incomplete. As another example, the content of messages transmitted and/or received by the user may be analyzed to identify actions that the user was requested to do or that the user promised/offered to perform. Messages received by the user may include messages that have been opened or read by the user, as well as messages that have not been opened or read by the user.

Analysis of messages may include performing pattern recognition to identify patterns within the messages that identify requests, promises, or offers in association with specific actions. More particularly, pattern recognition may include parsing messages and performing entity detection to identify entities such as date, time, parts of speech, and/or questions. For example, analysis of an electronic mail message that was received by the user may ascertain that his friend Fred has asked him to make reservations for dinner on Saturday night.

The candidates may be prioritized at 204. More particularly, the user interface object candidates may be prioritized by the server(s) 102 and/or client. The candidates may be prioritized based, at least in part, on any corresponding state information, which may indicate priorities and/or importance of any previously presented user interface objects. Prioritization of the candidates may also be performed based, at least in part, on the user profile. For example, the candidates may be prioritized based, at least in part, on persona(s), interest(s), and/or location(s) of the user.

In some embodiments, the server(s) 102 may transmit a list of prioritized candidates to the client. The client may choose to accept the priorities of the server(s) 102 or may reprioritize the candidates. The client may display one or more user interface objects (e.g., retargeting cards) corresponding to one or more candidates from the list or, alternatively, may choose not to display any user interface objects for the candidates identified in the list it has received.

As discussed above, the client may also identify its own "local" list of candidates, which it may prioritize or add to the list of candidates received from the server(s) prior to prioritizing. The client may determine whether to generate and/or display one or more user interface objects corresponding to candidates from the list according to the priorities assigned to the user interface objects.

One or more user interface objects (e.g., cards) may be provided at 206 for display via a client device of the user (e.g., associated with the user identifier) according to a result of the prioritizing. In accordance with various embodiments, one or more cards may be transmitted by the server(s) 102 and/or the client. For example, a retargeting card corresponding to the candidate having a highest priority may be provided for display via the client device.

As discussed above, the client device may determine whether or not to display any user interface objects. More particularly, the client device may determine whether to display a user interface object that has been identified as a user interface object candidate by the server(s) 102 or the client device. In some embodiments, the client device may determine whether to display a user interface object that has been received from the server(s) 102. If the client does decide to display a user interface object such as a card, the client may retrieve or generate (e.g., instantiate) the user interface object as appropriate and display the user interface object.

The client device may determine the appropriate timing for display of retargeting cards based, at least in part, on the prioritization, content, and/or associated state information. More particularly, the client device may display a retargeting card immediately or may choose to delay displaying a retargeting card until a suitable time. For example, the client device may choose to display a card reminding the user of an anniversary on the day prior to the anniversary.

A user interface object such as a card may enable the user to continue a previous task by resuming the previous state or original intent of the user. The user interface object may be one that was previously presented via a display of a client device, or may be generated (e.g., instantiated) by the server(s) or client device.

Where a candidate identifies a previously presented user interface object, the previously presented user interface object may be instantiated, retrieved, and/or displayed. In some instances, a card that includes content that the user has not yet viewed may be displayed. In other instances, a card may enable the state of an application that the user was using to be resumed. For example, where the user was reading an electronic mail message that includes a meeting invite, the electronic mail message that the user was reading when his or her device shut down may be presented, enabling the user to accept the invite without requiring the user to launch the electronic mail application or open the electronic mail message.

In some instances, a user interface object such as a card may be instantiated or generated to retarget the user's attention to a task that the user has not completed. For example, the retargeting card may include a URL or hypertext link to a web page presenting the user's shopping cart at a corresponding web site. As another example, the retargeting card may redirect the user's attention to an application that the user was previously using, and may further enable the user to resume the previous state of the application by clicking (e.g., tapping) on the retargeting card. As another example, the retargeting card may explicitly identify an unfinished action or action item that has been extracted from a calendar or communications of the user. The retargeting card may also include information identifying a source from which the unfinished action was identified (e.g., a calendar, a message sent to a particular user, a message received from a particular user, and/or an application via which the message was transmitted/received). As yet another example, the retargeting card may present an answer to a question posed by the user in previous communications or posed to the user in the communications.

A retargeting card may be displayed in a segment of a display of the client device. More particularly, a retargeting card may be displayed in an empty section of a display of a client device or may replace another user interface object within the display. For example, a retargeting card may be positioned within a homescreen of the client device. In some embodiments, retargeting card(s) may be positioned at the beginning (e.g., top) of a stream of cards displayed at a client device. A user may navigate the stream of cards by scrolling among the cards. Retargeting card(s) may be maintained on the display for a particular amount of time, which may be determined according to the user preferences.

In some embodiments, a user interface object such as a card may include a rectangular area (similar to a playing card) that includes text and/or image(s). More particularly, the card may include content that was previously presented to the user, but not viewed by the user. Alternatively, the card may remind the user to perform a task that the user may not have completed by identifying the task within the text of the card. For example, the card may ask the user if they have made a reservation for dinner on Saturday night. In some instances, a card may include a Uniform Resource Locator (URL) or a hypertext link that enables the user to complete a task. For example, the card may include a URL or hypertext link that enables the user to make a dinner reservation via OpenTable. Thus, a reminder of an incomplete task that is displayed within a card may be implicit and/or explicit. To view a card, the user may click on the card to display a larger, "full-size" version of the card.

The user may interact with a retargeting card in a number of different ways. More particularly, the user may click on the retargeting card to launch an application represented by the card or access content of the card. For example, the user may click on the card to display the content of a retargeting card in a larger screen view. In addition, the user may interact with the content of the card. In some instances, the content of the card may include a Uniform Resource Locator (URL) or hypertext link that the user may click on to access a corresponding web page.

User interaction with a retargeting card or lack thereof may be recorded in the user profile. A prediction model or retargeting rules may be updated based, at least in part, on the user interaction or lack thereof. The prediction model or retargeting rules may be used to identify user interface object candidates, as described herein.

Network Environment

The continuity of experience of a user may be facilitated in any of a wide variety of computing contexts. For example, implementations are contemplated in which users interact with a diverse network environment via any type of computer (e.g., desktop, laptop, tablet, etc.), media computing platforms (e.g., cable and satellite set top boxes and digital video recorders), handheld computing devices (e.g., PDAs), cell phones, or any other type of computing or communication platform.

Implementations are contemplated in which users interact with a diverse network environment. For example, the network environment may include a variety of networks.

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

User interface objects and any corresponding content may be identified, generated, and/or retrieved via a content distribution network. A distributed system may include a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

User interface objects may also be identified and presented in a peer-to-peer network. A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling devices via an ad hoc arrangement or configuration. A peer-to-peer network may employ some devices capable of operating as both a "client" and a "server."

In some embodiments, the network environment may include a wireless network that couples client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Communications transmitted via a network typically include signal packets. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

Signal packets may be communicated between devices of a network, such as, for example, to one or more sites employing a local network address. A signal packet may, for example, be communicated over the Internet from a user site via an access device coupled to the Internet. Likewise, a signal packet may be forwarded via network devices to a target site coupled to the network via a network access device, for example. A signal packet communicated via the Internet may, for example, be routed via a path of gateways, servers, etc. that may route the signal packet in accordance with a target address and availability of a network path to the target address.

Various embodiments may be employed via one or more servers. A computing device that is capable of sending or receiving signals, such as via a wired or wireless network, or capable of processing or storing signals, such as in memory as physical memory states, may operate as a server. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

User interface objects or associated content may be identified or provided via a content server. A content server may comprise a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example.

Examples of devices that may operate as a content server include desktop computers, multiprocessor systems, microprocessor-type or programmable consumer electronics, etc.

Input that is processed in accordance with the disclosed embodiments may be obtained using a wide variety of techniques. For example, an event planning request may be submitted via a user's interaction with a local application, web site or web-based application or service and may be accomplished using any of a variety of well-known mechanisms for obtaining information from a user. However, it should be understood that such methods of obtaining input from a user are merely examples and that user input may be obtained in many other ways.

Client Device

Figure 3:
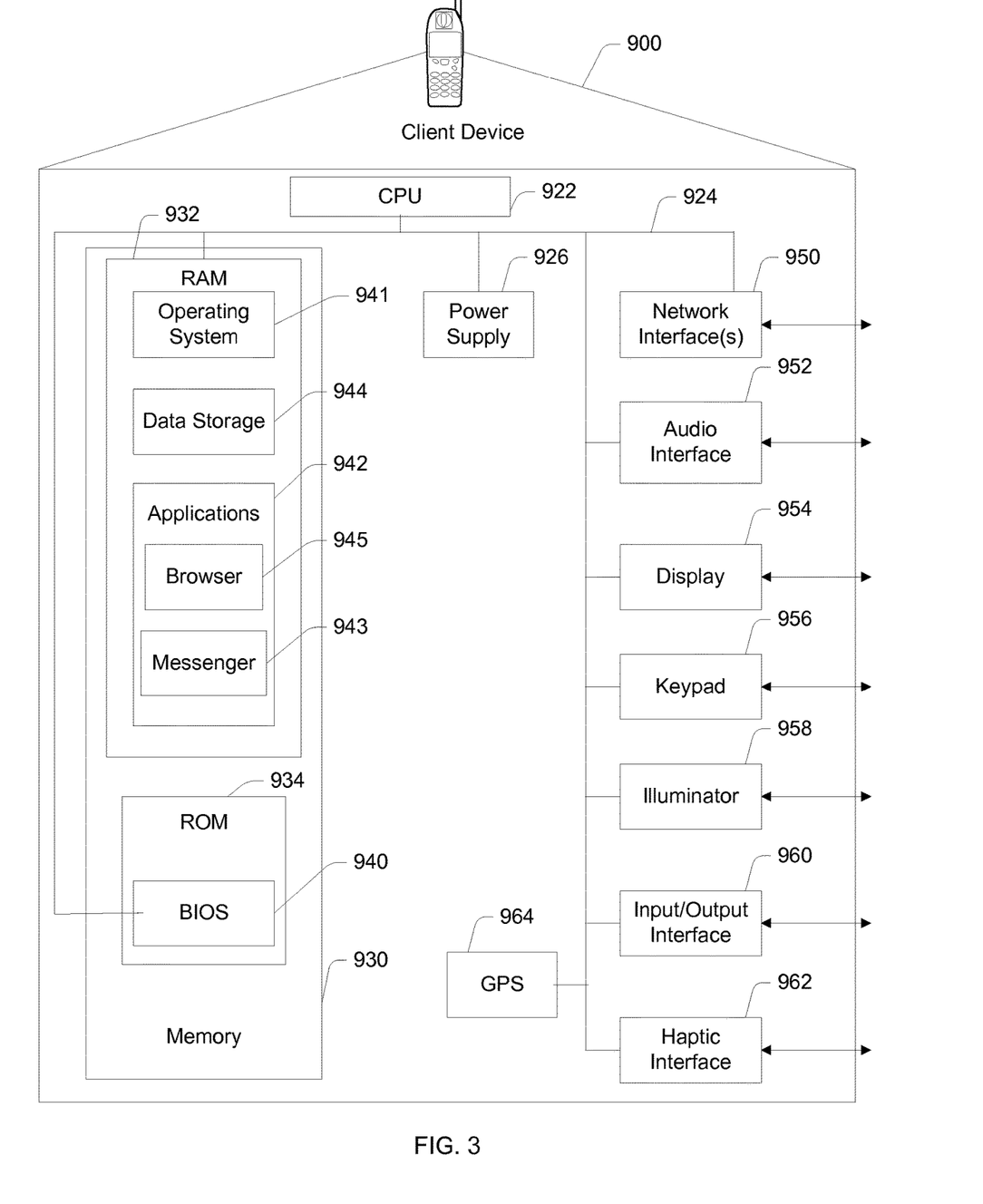
FIG. 3 is a diagram illustrating an example client device in which various embodiments may be implemented.

FIG. 3 is a schematic diagram illustrating an example embodiment of a client device in which various embodiments may be implemented. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. A portable device may also be referred to as a mobile device or handheld device.

As shown in this example, a client device 900 may include one or more central processing units (CPUs) 922, which may be coupled via connection 924 to a power supply 926 and a memory 930. The memory 930 may include random access memory (RAM) 932 and read only memory (ROM) 934. The ROM 934 may include a basic input/output system (BIOS) 940.

The RAM 932 may include an operating system 941. More particularly, a client device may include or may execute a variety of operating systems, including a personal computer operating system, such as a Windows, iOS or Linux, or a mobile operating system, such as iOS, Android, or Windows Mobile, or the like. The client device 900 may also include or may execute a variety of possible applications 942 (shown in RAM 932), such as a client software application such as messenger 943, enabling communication with other devices, such as communicating one or more messages, such as via email, short message service (SMS), or multimedia message service (MMS), including via a network, such as a social network, including, for example, Facebook, LinkedIn, Twitter, Flickr, or Google, to provide only a few possible examples. The client device 800 may also include or execute an application to communicate content, such as, for example, textual content, multimedia content, or the like, which may be stored in data storage 944. A client device may also include or execute an application such as a browser 945 to perform a variety of possible tasks, such as browsing, searching, playing various forms of content, including locally stored or streamed video, or games (such as fantasy sports leagues).

The client device 900 may send or receive signals via one or more interface(s). As shown in this example, the client device 900 may include one or more network interfaces 950. The client device 900 may include an audio interface 952. In addition, the client device 900 may include a display 954 and an illuminator 958. The client device 900 may further include an Input/Output interface 960, as well as a Haptic Interface 962 supporting tactile feedback technology.

The client device 900 may vary in terms of capabilities or features. Claimed subject matter is intended to cover a wide range of potential variations. For example, a cell phone may include a keypad such 956 such as a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) 964 or other location identifying type capability, or a display with a high degree of functionality, such as a touch-sensitive color 2D or 3D display, for example. The foregoing is provided to illustrate that claimed subject matter is intended to include a wide range of possible features or capabilities.

According to various embodiments, input may be obtained using a wide variety of techniques. For example, input may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

In some embodiments, an identity of the user (e.g., owner) of the client device may be statically configured. Thus, the device may be keyed to an owner or multiple owners. In other embodiments, the device may automatically determine the identity of the user of the device. For instance, a user of the device may be identified by deoxyribonucleic acid (DNA), retina scan, and/or finger print. From the identity of the user, a user profile and/or client profile may be identified or obtained.

Regardless of the system's configuration, it may employ one or more memories or memory modules configured to store data, program instructions for the general-purpose processing operations and/or the inventive techniques described herein. For example, the program instructions may control the operation of one or more applications. The memory or memories may also be configured to store instructions for performing the disclosed methods, graphical user interfaces to be displayed in association with the disclosed methods, etc.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks and magnetic tape; optical media such as CD-ROM disks; magneto-optical media such as optical disks; and hardware devices that are specially configured to store and perform program instructions, such as ROM and RAM. Examples of program instructions include both machine code, such as produced by a compiler, and files containing higher level code that may be executed by the computer using an interpreter.

Computer program instructions with which various embodiments are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques may be implemented in any suitable combination of software and/or hardware system, such as a web-based server or desktop computer system. An apparatus and/or web browser may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Although the foregoing embodiments have been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
    identifying a list of user interface object candidates associated with a user identifier based, at least in part, on states of user interface objects that have previously been presented via one or more client devices associated with the user identifier, the user identifier identifying at least one of a user account, a client device, or a browser;
    prioritizing the user interface object candidates based, at least in part, on the states of the user interface objects that have previously been presented via the one or more client devices associated with the user identifier; and
    providing one or more user interface objects for display within a homescreen of a second client device associated with the user identifier based, at least in part, on a result of the prioritizing, each of the user interface objects that is provided and each of the user interface objects that has previously been presented via the one or more client devices associated with the user identifier including at least one of a graphical representation or a user interface, wherein the providing comprises (i) identifying a first retargeting opportunity associated with a first user interface object based, at least in part, on a determination that a message sent in association with the first user interface object, from at least one of the user account, the client device or the browser, is indicative of an offer to perform an action, and (ii) providing the first user interface object for display within the homescreen of the second client device;
    wherein at least one of the identifying the list of user interface object candidates, the prioritizing, or the providing the one or more user interface objects for display are performed by at least one processor.

2. The method as recited in claim 1, at least one of the user interface object candidates corresponding to at least one of the user interface objects that has previously been presented via the one or more client devices associated with the user identifier and has an incomplete state.

3. The method as recited in claim 1, wherein at least one of the one or more user interface objects provided for display via the second client device comprises at least one of a Uniform Resource Locator (URL) or a hypertext link associated with a web page, at least one of the URL or the hypertext link facilitating completion of a task based, at least in part, on an interaction with at least one of the URL or the hypertext link within the one or more user interface objects.

4. The method as recited in claim 1, comprising:
    transmitting, by the second client device, a request to a server;
    receiving, by the second client device, information pertaining to an unfinished action associated with the user identifier from the server, the information being received responsive to the request;
    generating, by the second client device, a user interface object corresponding to the unfinished action using the information received from the server, the user interface object including at least one of a second graphical representation or a second user interface; and displaying, by the second client device, the user interface object within the homescreen of the second client device.

5. The method as recited in claim 1, wherein identifying the list of user interface object candidates comprises:
identifying unfinished actions of a user based, at least in part, on at least one of:
content of a message composed by the user and not sent, content of a message transmitted by the user, or content of a message that has been received by the user from one or more individuals via an application and indicates a task to be performed or completed by the user.

6. The method as recited in claim 1, comprising:
receiving, by the second client device, at least a portion of the list of user interface object candidates from a server;
determining, by the second client device, whether to generate or display a user interface object for a particular user interface object candidate in the list of user interface object candidates based, at least in part, on a result of prioritizing the list of user interface object candidates; and
generating or displaying within the homescreen, by the second client device, a user interface object for the particular user interface object candidate according to a result of the determining, the user interface object being generated or displayed including at least one of a second graphical representation or a second user interface.

7. The method as recited in claim 1, comprising:
generating, by the second client device, a user interface object using information associated with one of the user interface object candidates; and
displaying, by the second client device, the user interface object within the homescreen of the second client device, the user interface object including at least one of a second graphical representation or a second user interface.

8. The method as recited in claim 1, the states of the user interface objects that have previously been presented via the one or more client devices associated with the user identifier and one or more states associated with the one or more user interface objects being provided comprising, for at least one of the user interface objects that have previously been presented via the one or more client devices or at least one of the one or more user interface objects that is provided, at least one of:
a time that a user interface object was created, a time that content of the user interface object was created, a period of time that the user interface object was previously displayed via at least one client device associated with the user identifier, a deadline after which the user interface object will no longer be relevant and will be destroyed, a minimum time for which the user interface object is to be displayed, or an indication of importance of the user interface object that was assigned to the user interface object by an external server that generated and provided the user interface object, the importance being independent from priorities assigned to candidate user interface objects as a result of prioritizing the candidate user interface objects.

9. The method as recited in claim 1, comprising:
providing a graphical user interface (GUI) configured to receive preferences of a user; and
storing one or more preferences of the user received via the GUI in association with the user account;
wherein at least one of identifying the list of user interface object candidates or the prioritizing the user interface object candidates is performed based, at least in part, on the one or more preferences of the user, the one or more preferences of the user indicating at least one of: a persona of the user for which user interface objects are to be displayed or a source from which user interface object candidates are to be identified, the persona of the user being at least one of a plurality of personalities, at least one of a plurality of moods, at least one of a plurality of tones, or at least one of a plurality of interests.

10. The method as recited in claim 1, wherein identifying the list of user interface object candidates comprises extracting information from content of at least one of: messages composed by a user but not sent or messages sent by the user, the method comprising:
processing the information to identify one or more tasks; and
generating a user interface object based, at least in part, on the one or more tasks;
wherein the one or more user interface objects include the user interface object.

11. The method as recited in claim 1, each of the user interface objects being defined by a rectangular area.

12. The method as recited in claim 1, comprising:
determining, by the second client device, a particular time at which to display a particular user interface object, wherein the determining is performed based, at least in part, on a state associated with at least one of the particular user interface object or content of the particular user interface object; and
delaying, by the second client device, displaying the particular user interface object within the homescreen until the particular time.

13. An apparatus, comprising:
a processor; and
a memory, at least one of the processor or the memory being configured to:
identify a list of user interface object candidates associated with a user identifier based, at least in part, on states of user interface objects that have previously been presented via one or more client devices associated with the user identifier, the user identifier identifying at least one of a user account, a client device or a browser;
prioritize the user interface object candidates based, at least in part, on the states of the user interface objects that have previously been presented via the one or more client devices associated with the user identifier; and
provide one or more user interface objects for display within a homescreen of a second client device of the one or more client devices associated with the user identifier based, at least in part, on a result of the prioritizing, each of the user interface objects that is provided and each of the user interface objects that has previously been presented via the one or more client devices associated with the user identifier including at least one of a graphical representation or a user interface, wherein the providing comprises (i) identifying a first retargeting opportunity associated with a first user interface object based, at least in part, on a determination that the first user interface object was displayed for at least a minimum threshold period of time, and (ii) responsive to identifying the first retargeting opportunity, providing the first user interface object for display within the homescreen of the client device.

14. The apparatus as recited in claim 13, each of the user interface object candidates corresponding to at least one of: a) one of the user interface objects that has previously been presented via at least one client device of the one or more client devices associated with the user identifier or b) at least one user interface object that has not been generated, wherein identifying the list of user interface object candidates comprises:
identifying a user interface object that has previously been presented via the one or more client devices associated with the user identifier and has an incomplete state, the incomplete state indicating at least one of: the user interface object has been displayed for at least the minimum threshold period of time, or the user interface object is going to be destroyed within a threshold amount of time.

15. The apparatus as recited in claim 13, wherein at least one of the one or more user interface objects provided for display via the second client device comprises at least one of a Uniform Resource Locator (URL) or a hypertext link associated with a web page, at least one of the URL or the hypertext link facilitating completion of a task based, at least in part, on an interaction with at least one of the URL or the hypertext link within the one or more user interface objects.

16. The apparatus as recited in claim 13, the at least one of the processor or the memory being configured to:
transmit a request to a server;
process information pertaining to an unfinished action associated with the user identifier from the server, the information being received responsive to the request;
generate a user interface object corresponding to the unfinished action using the information received from the server, the user interface object including at least one of a second graphical representation or a second user interface; and
provide the user interface object for display within the homescreen of the second client device.

17. The apparatus as recited in claim 13, wherein identifying the list of user interface object candidates comprises:
identifying unfinished actions of a user based, at least in part, on at least one of: content of a message composed by the user and not sent, content of a message transmitted by the user, or content of a message that has been received by the user from one or more individuals via an application and indicates a task to be performed or completed by the user.

18. The apparatus as recited in claim 13, the at least one of the processor or the memory being configured to:
obtain at least a portion of the list of user interface object candidates from a server;
determine whether to generate or display a user interface object for a particular user interface object candidate in the list of user interface object candidates based, at least in part, on a result of prioritizing the list of user interface object candidates; and
generate and provide for display within the homescreen the user interface object for the particular user interface object candidate according to a result of the determining.

19. A computer program product comprising one or more non-transitory computer-readable media having computer program instructions stored therein, the computer program instructions being configured such that, when executed by one or more computing devices, the computer program instructions cause the one or more computing devices to:
identify a list of user interface object candidates associated with a user identifier based, at least in part, on states of user interface objects that have previously been presented via one or more client devices associated with the user identifier, the user identifier identifying at least one of a user account, a client device, or a browser;
prioritize the user interface object candidates based, at least in part, on the states of the user interface objects that have previously been presented via the one or more client devices associated with the user identifier; and
provide one or more user interface objects for display within a homescreen of a second client device associated with the user identifier based, at least in part, on a result of the prioritizing, each of the user interface objects that is provided and each of the user interface objects that has previously been presented via the one or more client devices associated with the user identifier including at least one of a graphical representation or a user interface, wherein the providing comprises at least one of:
(i) identifying a first retargeting opportunity associated with a first user interface object based, at least in part, on a determination that a message sent in association with the first user interface object, from at least one of the user account, the client device or the browser, is indicative of an offer to perform an action, and (ii) responsive to identifying the first retargeting opportunity, providing the first user interface object for display within the homescreen of the second client device; or
(i) identifying a second retargeting opportunity associated with a second user interface object based, at least in part, on a determination that the second user interface object was displayed for at least a minimum threshold period of time, and (ii) responsive to identifying the second retargeting opportunity, providing the second user interface object for display within the homescreen of the client device.

20. The computer program product as recited in claim 19, wherein identifying the list of user interface object candidates comprises:
identifying a set of user interface objects that have previously been presented via the one or more client devices associated with the user identifier and have an incomplete state.

21. The computer program product as recited in claim 19, wherein the providing the one or more user interface objects for display comprises both providing the first user interface object for display within the homescreen of the second client device and providing the second user interface object for display within the homescreen of the client device.

22. The computer program product as recited in claim 19, the computer program instructions being configured to:
transmitting a request to a server;
processing information pertaining to an unfinished action associated with the user identifier from the server, the information being received responsive to the request;
generating a user interface object corresponding to the unfinished action using the information received from the server, the user interface object including at least one of a second graphical representation or a second user interface; and providing the user interface object for display within the homescreen of the second client device.

23. The computer program product as recited in claim 19, wherein identifying the list of user interface object candidates comprises:
   identifying unfinished actions of a user based, at least in part, on at least one of: content of a message composed by the user and not sent, content of a message transmitted by the user, or content of a message that has been received by the user from one or more individuals via an application and that indicates a task to be performed or completed by the user.

24. The computer program product as recited in claim 19, the computer program instructions being configured to:
   obtain at least a portion of the list of user interface object candidates from a server;
   determine whether to generate or display a user interface object for a particular user interface object candidate in the list of user interface object candidates based, at least in part, on a result of prioritizing the list of user interface object candidates; and
   generate and provide for display within the homescreen the user interface object according to a result of the determining.

* * * * *